United States Patent [19]

Kalchschmied et al.

[11] Patent Number: 4,498,696
[45] Date of Patent: Feb. 12, 1985

[54] BUMPER FOR AUTOMOTIVE VEHICLES

[75] Inventors: Dietmar Kalchschmied, Munich; Hartmut Bonenberger, Puchheim; Bernd Huber, Munich, all of Fed. Rep. of Germany

[73] Assignee: Bayerische Motoren Werke AG, Fed. Rep. of Germany

[21] Appl. No.: 501,281

[22] Filed: Jun. 6, 1983

[30] Foreign Application Priority Data

Jun. 5, 1982 [DE] Fed. Rep. of Germany ....... 3221293

[51] Int. Cl.³ .............................................. B60R 19/04
[52] U.S. Cl. .................................... 293/126; 293/155
[58] Field of Search ................ 293/126, 120, 132–137, 293/149, 154, 155

[56] References Cited

U.S. PATENT DOCUMENTS 3,861,728 1/1975 Haberle et al. ...................... 293/126
4,251,096 2/1981 Stock .................................... 293/126

FOREIGN PATENT DOCUMENTS 2361213 6/1975 Fed. Rep. of Germany .

Primary Examiner—Robert R. Song
Attorney, Agent, or Firm—Craig & Burns

[57] ABSTRACT

The lateral end sections of a bumper each carry a sliding member with a U-shaped cross-sectional profile. The two legs of each are surrounded in fork-like fashion by the legs of a retaining member attached to the vehicle body also having a U-shaped cross-sectional profile. The legs of the sliding member each are provided with an intermediate layer of a rubber-elastic material. On the inside of the legs of the retaining member, inclined surfaces are provided which are inclined in mirror-image symmetry to a plane of symmetry of the U-shaped cross-sectional profile of the retaining member and which extend toward the base. These inclined surfaces respectively include a curvature. A second curvature adjoins this first-mentioned curvature.

Upon the introduction of an impact force to the end sections of the bumper, which force is directed toward the vehicle body and generally in the transverse direction of the vehicle, the intermediate layers slide along the inclined surfaces and are continuously compressed to an ever increasing extent. Thus, the impact energy introduced to the end sections is absorbed up to a certain magnitude without damage to the end sections and their mountings.

18 Claims, 5 Drawing Figures

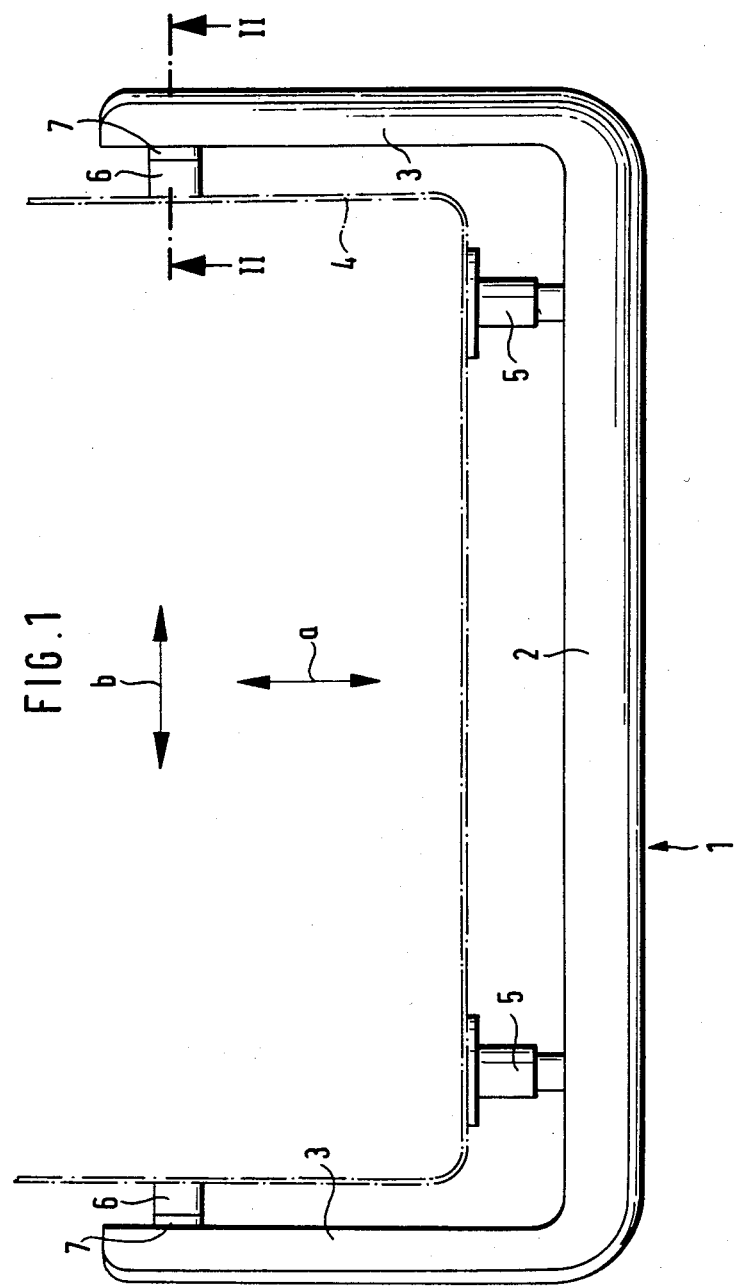

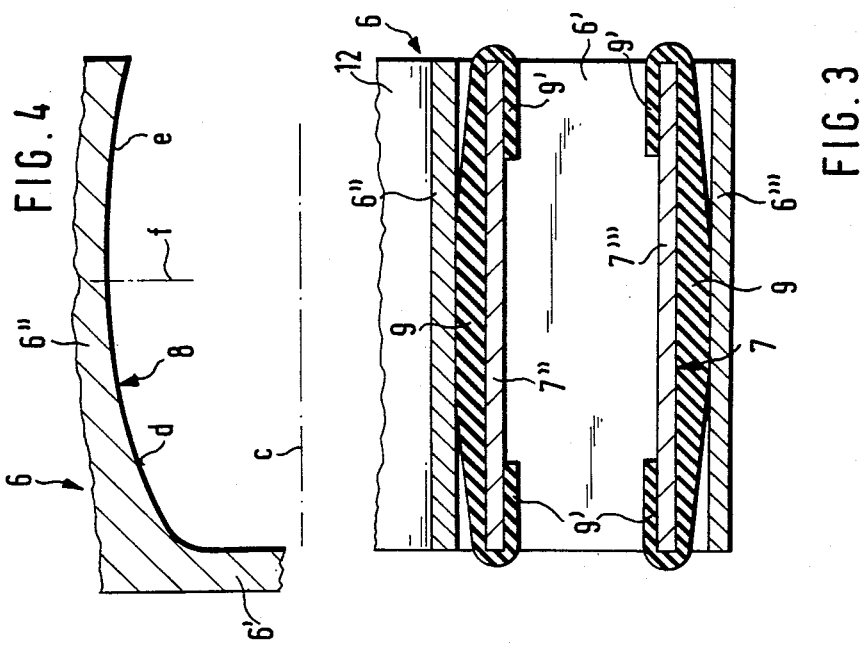
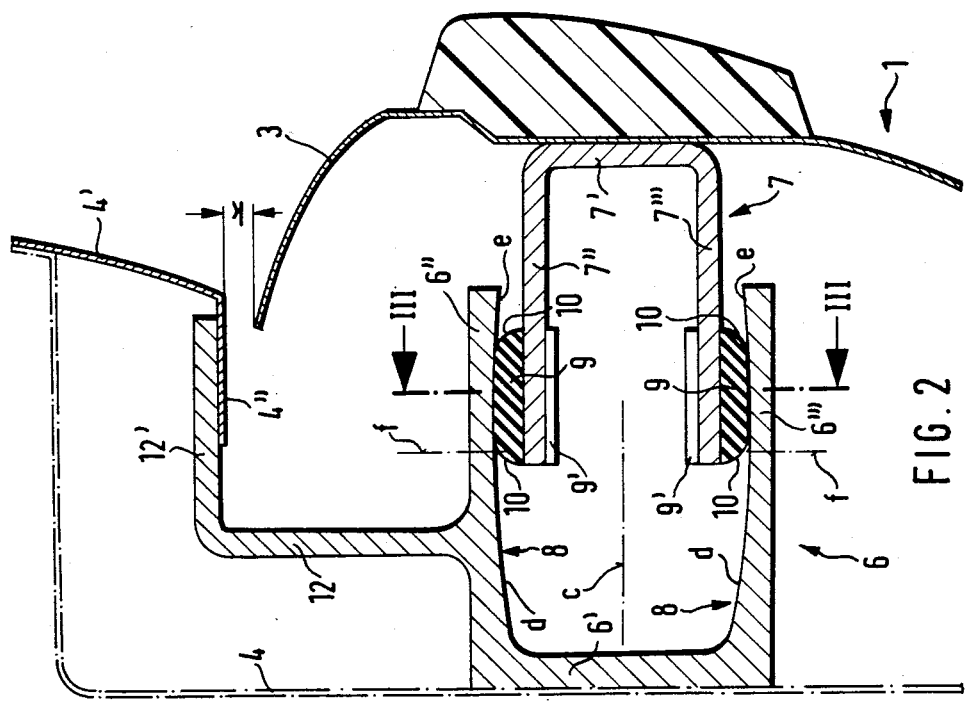

BUMPER FOR AUTOMOTIVE VEHICLES

BACKGROUND OF THE INVENTION

The invention relates to a vehicle bumper of the type generally set forth in DAS (German Auslegeschrift) No. 2,361,213.

In conventional bumpers designed to be displaced in the longitudinal direction of the vehicle there is a sliding member constructed as an offset holding bracket having a U-shaped cross-sectional profile open toward the body and a retaining member fashioned as a rectangular body having a window-like aperture. The sliding member is displaceable in the window-like opening of the body, which opening is lined with a synthetic resin, in the longitudinal direction of the vehicle. There is a broad side of the rectangular body which lies horizontally and the sliding member is narrower than this broad side in the transverse direction of the vehicle. The thus-constructed mounting for the end parts of the bumper has the disadvantage that, with an impact exerted thereon approximately in the transverse direction of the vehicle toward the vehicle body, the thus-produced impact energy is not absorbed with the result that at least the sliding member can very easily be deformed in its guide zone and thus rendered questionable in its operability, i.e., if called upon to slide in a direction parallel to the longitudinal axis of the vehicle.

SUMMARY OF THE INVENTION

Therefore, it is an object of the invention to design the mounting for the end sections of a bumper of the above-discussed type in such a way that, in case of an impact force on the end sections in the transverse vehicle direction, i.e., toward the vehicle body, the impact energy is readily absorbed at least up to a certain magnitude.

According to this invention a mounting device for each end of the bumper includes inclined surfaces provided on either a retaining member or a sliding member wherein the members are in fork-like interengagement with each other at their mutually facing free end sections. Thus upon the displacement of the lateral end sections of the bumper, in case of an impact force acting thereon transverse of vehicle direction, i.e., toward the vehicle body, the free ends of either the retaining member or the sliding member slides along the inclined surface of the other member whereby the impact energy introduced into an end member is dissipated by the thus-produced, continuously increasing frictional resistance between this inclined surface and the free ends, without damages to the end sections or the mountings.

With two mutually facing inclined surfaces provided on the retaining member, the frictional resistance and thus the energy absorption can be considerably increased. Furthermore, the U-shaped cross-sectional profile of the retaining member, open toward the end sections of the bumper, has the advantage that the sliding member, to mount the bumper, can be inserted quickly and without effort in the retaining member.

Additionally, to make the inclined surfaces of a curved configuration with an additional curvature leading thereinto and the lowest-positioned point of the curvatures being located in the zone of the longitudinal line of symmetry of the legs has the effect that, if an elastic intermediate layer is applied to the outside of the legs of the sliding member in a pretensioned manner, then the end members of the bumper, after a force has been introduced relative to the end members which is oriented angularly relative to the longitudinal plane of the vehicle, tend to return automatically into their rest position. In this connection, no additional attachment of the end members is required, for proper positioning.

A trapezoidal configuration of the elastic intermediate layer and rounding thereof toward the topside affords the advantage that the retaining member and the sliding member can be displaced with respect to each other unhindered within several degrees of freedom. The retaining member and the sliding member can be manufactured from a light metal so that the mounting as a whole has a relatively minor weight.

By the arrangement of an angled supporting member formed as part of the retaining member resting on an angled portion of the body sidewall, the level at which the end sections of the bumper are disposed with respect to the body can be exactly determined in a simple and always reproducible fashion.

Accordingly, it is an object of the present invention to provide a supporting means for a bumper for vehicles, especially motor vehicles, which avoids, by simple means, shortcomings and disadvantages encountered in the prior art.

Another object of the present invention resides in providing a bumper support means which will support the end portions of the bumper while assisting and permitting the same to absorb a laterally directed impact.

A further object of the present invention resides in providing a bumper support which after assisting the end portions of a bumper in absorbing a lateral impact automatically returns the end portions of the bumper to their initial position.

A still further object of the present invention resides in providing a bumper support which includes a portion fixed relative to the vehicle body and a second portion fixed relative to a bumper end portion.

Another object of the present invention resides in providing a bumper support which includes a first substantially U-shaped portion having inclined surfaces and a second substantially U-shaped portion which includes free ends that cooperate with the inclined surfaces to absorb and dissipate the energy of a lateral impact.

A still further object of the present invention resides in providing a bumper support which includes a first substantially U-shaped portion and a second substantially U-shaped portion, wherein one of the U-shaped portions has elastic members associated with the free ends which assist in cooperating with the other U-shaped member for guiding the members relative to one another and absorbing a lateral impact on the bumper end portion.

These and other objects, features, and advantages of the present invention will become more apparent from the following description when taken in connection with the accompanying drawing which shows for the purposes of illustration only, a principal embodiment in accordance with the present invention, and wherein:

BRIEF DESCRIPTION OF THE DRAWINGS

FIG. 1 is a top view of a bumper mounted in accordance with the instant invention;

FIG. 2 is a section along line II—II in FIG. 1 on an enlarged scale;

FIG. 3 is a section along line III—III in FIG. 2;

FIG. 4 is an enlarged view of a detail from FIG. 2; and

DESCRIPTION OF THE PREFERRED EMBODIMENTS

Figure 5:
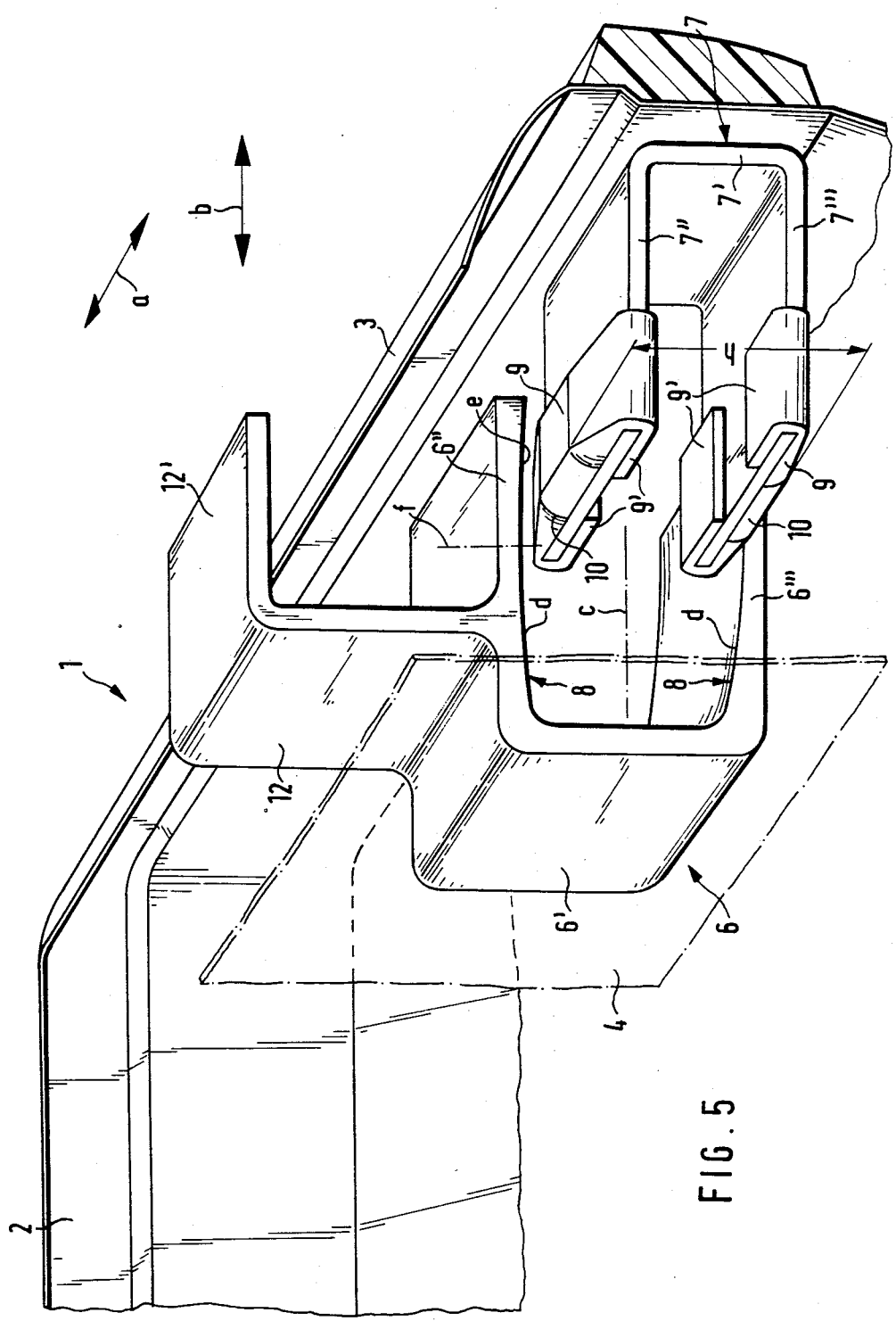
FIG. 5 is a perspective view of the mounting arrangement for the lateral end sections of the bumper, the bumper being partially shown, wherein the retaining member of the sliding member are out of engagement.

Referring now to the drawings wherein like reference numerals are used throughout the various views to designate like parts and, more particularly to FIG. 1 wherein the bumper 1 includes a central section 2 and two lateral end sections 3 adjoining this central section and formed integrally therewith. The central section 2 is typically supported by two hydraulic shock absorbers 5 attached to the front and/or rear zone of a passenger automobile, the vehicle body shown in phantom as is denoted by 4. Instead of these shock absorbers, the central section 2 can also be rigidly attached to the vehicle body 4.

As can be seen from FIGS. 1 and 2, the two end sections 3 are supported by the vehicle body 4 by way of a retaining member 6 and a sliding member 7 which preferably are formed of a light metal. The retaining member 6 has a generally U-shaped cross-sectional profile and includes a base 6' which is mounted to the vehicle body 4. Each retaining member projects away from the body in the transverse direction of the vehicle. The sliding member 7 likewise has a generally U-shaped cross-sectional profile and is attached, in opposition to the retaining member 6, with its base 7' to, respectively, one end section 3 of the bumper 1. Each sliding member 7 includes two legs 7", 7"' with free ends that are encompassed in a fork-like fashion by the free end sections of the two legs 6", 6"' of the retaining member 6.

On the inside of the legs 6", 6"' of the retaining member 6, respectively, an inclined surface 8 (see FIG. 2) is provided, starting from the central zone, generally designated by f, of the longitudinal extension of the legs 6", 6"'. Each inclined surface, respectively, is inclined in mirror-image symmetry toward the plane of symmetry c of the U-shaped cross-sectional profile of the retaining member 6 and extends toward the respective base 6' thereof. As can be seen from FIG. 4, the inclined surfaces lying adjacent to the vehicle body 4 are each fashioned as a first curvature d extending in the longitudinal direction, i.e., the direction of the double arrow a, of the vehicle, i.e., the inclined surface is concave relative to the plane of symmetry c in the longitudinal direction of the vehicle. A second curvature designated by e adjoins the first curvature and the second curvature extends from the zone of the longitudinal line f, generally referred to as the centralized zone of transition, of the legs 6", 6"' toward the free ends thereof. In this arrangement the first curvature d on each of the legs are curved more strongly than the second curvatures e, i.e., the latter curvature have a larger radius of curvature than the curvatures d.

The free end sections of the two legs 7", 7"' of the sliding member 7 are each equipped with an intermediate layer 9 which is preferably a rubber-elastic materal (see FIGS. 2, 3 and 5). These layers are attached, for example, by being cemented thereto or vulcanized thereon, in mutual opposition to the outside of the legs 7", 7"' and are of a trapezoidal shape (see FIG. 3) with the base resting on the legs, respectively. The end faces of the intermediate layers 9 are fashioned as rounded portions 10 extending to the topside thereof whereas the free end sections 9' of the intermediate layers 9 extend underneath the legs 7", 7"' and secure the layers relative thereto. The relatively soft, pressure-elastic core of the intermediate layers 9, which core is of a rubber-elastic material, is encased by a synthetic resin skin which is hard, and is very resistant to frictional stress, i.e., is extensively wearproof.

The sliding member 7, in its assembled condition, has a predetermined total height h which includes the intermediate layers 9, such that the legs of the sliding member 7 with the layers 9 in place can be inserted with pretensioning between the legs 6", 6"' during the assembly of the bumper 1 to the vehicle and thus during the joining of the end sections 3 with the retaining members 6 attached to the vehicle body 4. Since the intermediate layers 9, in the at rest positions of the end sections 3 of the bumper 1, as depicted in FIG. 2, are substantially centrally located relative to the curvatures d and e provided on the legs 6", 6"', these layers can slide within the curvatures d and e when an impact force occurs on the central section 2 of the bumper. The maximum movement necessarily accommodated corresponding to the telescoping depth of the shock absorbers 5 during the subsequent recoil of the central section 2 in the longitudinal vehicle direction, i.e., directions of the double arrow a. Due to the externally disposed rims of these curvatures, projecting toward the plane of symmetry c, no additional mounting of the end sections 3 is required.

Upon the introduction of an impact force to the end sections 3 oriented in a direction generally transverse to the vehicle direction and toward the vehicle body 4, the sliding member 7 is displaced by way of the end section 3 in the transverse direction of the vehicle toward the longitudinal plane of symmetry of the vehicle, i.e, in the directon of double arrow b. Accordingly, intermediate layers 9 are shifted along the inclined surfaces 8 provided on the legs 6", 6"'. Since these surfaces are inclined toward the plane of symmetry c of each retaining member 6, the two intermediate layers 9, formed of a rubber-elastic material, are compressed to a constantly more vigorous extent and to the same degree, and also the existing frictional resistance on their outside, in contact with the inclined surfaces 8, is continuously increased, whereby the impact energy introduced to the end sections 3 is damped and absorbed up to a specific magnitude. The magnitude corresponding to a relatively small impact stress, but up to at least a moderate impact stress, which can be absorbed without damage to the end sections 3 and their mountings. In this arrangement, the free end sections of the legs 7", 7"' of the sliding member 7 simultaneously also converge resiliently to some extent and thus contribute toward impact energy absorption and imparct attenuation. Inasmuch as the inclined surfaces 8 are respectively fashioned to include the curvatures d, the impact energy absorption runs along a progressive characteristic curve. Another advantage of the curvatures d resides in that once the impact stress exerted on the end sections 3 has disappeared, the intermediate layers 9 will naturally spring back, thus also reducing the frictional resistance, and thereby will tend to automatically return the end sections 3 to their at rest position by the thus-occurring sliding of the layers 9 along the smooth surfaces of the curvatures d in the transverse vehicle direction to their rest position, i.e., to the centralized transitional zone of curvatures d and e.

Since the externally located rims of the curvatures e project toward the plane of symmetry c, these rims, finally, limit the diaplacement of the intermediate layers 9 when the latter are in their rest position. Since the intermediate layers 9 are fashioned of trapezoidal form and exhibit the rounded portions 10 along their end faces, they can be advantageously displaced unhindered during the aforedescribed displacements in the longitudinal and transverse vehicle directions, as well as running obliquely with respect thereto. Intentional bending zones are provided at the transitional regions of the end sections 3 to the central section 2 of the bumper 1, by means of which the end sections 3 can be shifted relative to the central section 2.

A supporting angle 12, extending perpendicularly in the upward direction, projects from the top-positioned leg 6" of the retaining member 6. Leg 12' of this angle, extending horizontally, is attached to an inwardly oriented angled portion 4" of the body sidewall 4'. In this connection, the vertical extension of the supporting angle 12 is dimensioned so that, with the retaining member 6 being mounted, an air gap k is present between the angled portion 4" and the top edge of the end sections 3 facing this portion. The gap k is of such a size that unhindered displaceability in the longitudinal and transverse directions of the vehicle is ensured for the end sections. Thus, by the supporting angle 12 provided on the retaining member 6, the vertical level of the end sections 3 of the bumper 1 with respect to the vehicle body 4 is determined in an exact and always reproducible way. In the rest position of the end sections 3, the amount of spacing between the top edge of the sections 3 and the supporting angle 12 corresponds generally to the spacing between the free ends of the legs 7", 7''' of the sliding member 7 and the base 6' of the retaining member 6.

While we have shown and described only one embodiment in accordance with the present invention, it is understood that the same is not limited thereto but is susceptible to numerous changes and modifications as known to one having ordinary skill in the art, and we therefore do not wish to be limited to the details shown and described herein, but intend to cover all such modifications as are encompassed by the scope of the appended claims.

What is claimed is:

1. A bumper for automotove vehicles with a central section displaceable in the longitudinal direction of the vehicle and two lateral end sections adjoining the central section, each of the end sections positioned relative to the vehicle by a retaining member projecting away from the vehicle body in the transverse direction of the vehicle and by a sliding member attached, respectively, to each of the end sections, one of the retaining member and the sliding member for each of the end sections encompassing the other in a fork-like fashion so that the end sections are diplaceable in the longitudinal direction of the vehicle as well as in the transverse direction of the vehicle, one of the retaining member and the sliding member for each of the end sections including at least one inclined surface inclined toward a plane of symmetry associated with a mouth of the fork, the retaining member and sliding member for each of the end sections cooperating by way of said at least one inclined surface to absorb and dissipate an impact received by the respective end section.

2. A bumper according to claim 1, wherein each retaining member has a generally U-shaped cross-sectional profile including a pair of legs and a base and an inclined surface inclined toward a plane of symmetry extending between the legs, each inclined surface emanating in each case from a central zone of the longitudinal extension of each of the legs and extending in mirror-image symmetry toward the base, and the U-shaped cross-sectional profile retaining member being attached to the vehicle body.

3. A bumper according to claim 2, wherein each inclined surface of the retaining member is fashioned with a curvature extending in the longitudinal directon of the vehicle.

4. A bumper according to claim 3, wherein the curvature of the inclined surface of each of the legs of the retaining member is respectively followed by a second curvature extending toward the free ends of the legs.

5. A bumper according to claim 4, wherein the curvature of each inclined surface is fashioned of a stronger curvature than each second curvature.

6. A bumper according to claim 1, wherein each sliding member has a generally U-shaped cross-sectional profile including a pair of legs and a base, each sliding member cooperates with a respective retaining member by way of an intermediate layer associated with each of the legs, the base of the cross-sectional profile of the sliding member faces a respective end section and is attached directly to the end section, each intermediate layer is fashioned to be resiliently secured on the outside of the free ends of the two legs of each sliding member, each sliding member with an intermediate layer associated with each of the legs has a total height such that it can be inserted with pretensioning in between the legs of the retaining member.

7. A bumper according to claim 6, wherein the intermediate layers include a portion of trapezoidal form as seen looking toward the free ends of the legs of the sliding member, and wherein end faces of the layers are fashioned as rounded portions extending toward a topside thereof.

8. A bumper according to claim 6, wherein the intermediate layers include a relatively soft core of a rubber-elastic material encased by a hard synthetic resin skin.

9. A bumper according to claim 1, wherein a supporting angle projecting and extending vertically upwardly from the topside of each retaining member includes a horizontally extending leg attached to an inwardly pointing angled portion of the body sidewall wherein an air gap exists between an angled portion and the top edge of each section of the bumper.

10. A bumper mount for vehicle bumper end sections, the bumper end sections extending from opposite ends of a bumper central section and along opposite sides of the vehicle, the central section being displaceable in the longitudinal direction of the vehicle and adapted to absorb impact, comprising a retaining member for each bumper end section secured relative to and projecting away from the vehicle body in a direction transverse of the vehicle direction of travel and a sliding member secured relative to and projecting inwardly toward the vehicle body from each end section of the bumper, one of the retaining member and the sliding member for each bumper end section encompassing the other in a manner allowing the respective end section to be displaceable in the longitudinal direction of the vehicle as well as in the transverse direction of the vehicle, one of the retaining member and the sliding member for each bumper end section including at least one inclined surface inclined toward a plane of symmetry associated with the respective member, the retaining member and sliding member cooperating by way of said at least one inclined surface to absorb and dissipate an impact having less than a predetermined amount of force directed generally in a direction transverse to the longitudinal direction of the vehicle.

11. A bumper mount as set forth in claim 1, wherein the retaining member has a generally U-shaped cross-sectional profile including a pair of legs and a base, each of the legs of the pair of legs including an inclined surface inclined toward a plane of symmetry extending between the legs, each inclined surface emanating in each case from a central zone of the longitudinal extension of each of the legs and extending in mirror-image symmetry toward the base.

12. A bumper mount as set forth in claim 11, wherein each inclined surface of the retaining member is fashioned with a curvature extending in the longitudinal direction of the vehicle.

13. A bumper mount as set forth in claim 12, wherein the curvature of the inclined surface of each of the legs of the retaining member is respectively followed by a second curvature extending toward the free ends of the legs.

14. A bumper mount as set forth in claim 13, wherein the curvature of each inclined surface is of a greater degree of curvature than each second curvature.

15. A bumper mount as set forth in claim 10, wherein the sliding member has a generally U-shaped cross-sectional profile including a pair of legs and a base with an intermediate layer associated with each of the legs, the base of the sliding member facing a respective end section and being attached directly thereto, each intermediate layer being secured on the outside of the free ends of the two legs of each sliding member, wherein the sliding member with an intermediate layer associated with each of the legs has a total height such that it can be inserted with pretensioning in between the legs of the retaining member.

16. A bumper mount as set forth in claim 15, wherein each intermediate layer includes a portion of a generally trapezoidal shape as seen looking toward the free ends of the legs of the sliding member, and wherein end faces of the layers are fashioned to include rounded portions extending toward a topside thereof.

17. A bumper mount as set forth in claim 15, wherein each intermediate layer includes a relatively soft core of a rubber-elastic material encased by a hard synthetic resin skin.

18. A bumper mount as set forth in claim 10, wherein a supporting angle projects and extends vertically upwardly from a topside of each retaining member and includes a horizontally extending leg attached to an inwardly pointing angled portion of the body sidewall wherein an air gap exists between an angled portion and the top edge of each end section of the bumper.

* * * * *